United States Patent [19]

Rehmat

[11] Patent Number: 5,843,382
[45] Date of Patent: Dec. 1, 1998

[54] METHOD AND APPARATUS FOR REMOVING SULFUR FROM SOLUTION IN LIQUID REDOX SULFUR REMOVAL PROCESSES

[75] Inventor: Amirali G. Rehmat, Darien, Ill.

[73] Assignee: Gas Research Institute, Chicago, Ill.

[21] Appl. No.: 728,057

[22] Filed: Oct. 9, 1996

Related U.S. Application Data

[63] Continuation of Ser. No. 446,107, May 19, 1995.
[51] Int. Cl.$^6$ .................................................. B01D 50/00
[52] U.S. Cl. .......................................... 422/170; 422/171
[58] Field of Search ..................................... 422/170, 171

[56] References Cited

U.S. PATENT DOCUMENTS

| | | | |
|---|---|---|---|
| 2,581,135 | 1/1952 | Odell | 23/3 |
| 2,682,444 | 6/1954 | Phillipps | 23/2 |
| 2,733,979 | 2/1956 | Haensel | 23/2 |
| 3,117,844 | 1/1964 | Bureau | 23/260 |
| 4,243,648 | 1/1981 | Fenton | 423/573 R |
| 4,283,379 | 8/1981 | Fenton et al. | 423/571 |
| 4,485,082 | 11/1984 | Blytas | 423/573 R |
| 4,528,169 | 7/1985 | La Mori et al. | 423/231 |
| 4,705,676 | 11/1987 | Fong et al. | 423/567 A |
| 4,722,799 | 2/1988 | Ashbrook et al. | 210/722 |
| 4,859,436 | 8/1989 | Olson et al. | 423/221 |
| 4,931,262 | 6/1990 | Sonta et al. | 423/220 |
| 5,122,351 | 6/1992 | Hardison | 423/220 |
| 5,126,118 | 6/1992 | Hardison | 423/231 |
| 5,139,753 | 8/1992 | Hardison | 423/220 |
| 5,273,734 | 12/1993 | Sawyer et al. | 423/573.1 |

FOREIGN PATENT DOCUMENTS

| | | |
|---|---|---|
| 474347 | 11/1975 | U.S.S.R. . |
| 197708 | 8/1977 | U.S.S.R. . |

OTHER PUBLICATIONS

"Bacteria help desulfurize gas", *Hydrocarbon Processing*, pp. 76–D to 76–F, May 1988.

*Primary Examiner*—Edward J. Cain
*Attorney, Agent, or Firm*—Factor and Shaftal,LLC

[57] ABSTRACT

An apparatus and process for the removal of sulfur, in the form of hydrogen sulfide, from gas, such as natural gas or industrial gas streams, in which the sulfur is removed and separated in the form of molten elemental sulfur.

10 Claims, 1 Drawing Sheet

SULFUR RECOVERY FROM A LIQUID REDOX PROCESS

METHOD AND APPARATUS FOR REMOVING SULFUR FROM SOLUTION IN LIQUID REDOX SULFUR REMOVAL PROCESSES

This application is a continuation of application Ser. No. 08/446,107, filed May 19, 1995 pending.

BACKGROUND OF THE INVENTION

1. Field of the Invention

The present invention relates generally to liquid redox processes for the removal of sulfur from gases, such as natural gas.

2. The Prior Art

Hydrogen sulfide is often encountered in gas streams, such as when natural gas is being extracted from the ground, or in various industrial processes. In the presence of oxygen, hydrogen sulfide can form various oxides which are not only pollutants (which can contribute to acid rain), but also can be corrosive or otherwise damaging to equipment, such as pipelines and other machinery.

Processes for the removal of hydrogen sulfide from gas streams are known. A basic agent such as an amine has also been employed, in which case the amine is regenerated for reuse as absorbent by heat, for example by steam. A variety of non-regenerable processes using Fe-based solids, liquid-based processes using caustic triazine, or nitratrites are also widely employed. For economic reasons, the regenerable processes such as amines and liquid redox are more attractive as total sulfur increases, for example, above 50–100 lbs. per day. When conversion to elemental sulfur is desired for environmental or regulatory reasons, liquid redox processes are preferred when total sulfur is less than 5–25 tons per day. Above this capacity, amine or other solvents, followed by various amine offgas treating processes (which may also include liquid redox processes), after application of the Claus process, are preferred due to lower costs.

Generally, in a typical liquid redox process, an oxidation-reduction ("redox") system is used in which the hydrogen sulfide-laden gas ("sour" gas) is exposed to a sulfide precipitation catalyst material (for example, a metal oxide, in which the metal cation changes from a higher valence state to a lower state, upon reaction with the hydrogen sulfide), and the gas, now with a substantially reduced level of hydrogen sulfide ("sweet" gas) is then piped onward to its intended use.

After passing through the absorber, at least a portion of the sulfur will have precipitated out of the precipitation catalyst solution as elemental sulfur. The precipitation catalyst solution is then sent to some form of regeneration apparatus, such as an oxidizer, so as to restore the metal cation in the precipitation catalyst solution to the desired higher valence state, so that the solution may be returned to the absorber to absorb more hydrogen sulfide from the gas stream.

Some processes, such as that disclosed in Sawyer et al., U.S. Pat. No. 5,273,734, withdraw the elemental sulfur from the spent absorber solution prior to exposure of the spent solution to the regenerator. In other processes, such as that disclosed in Fenton et al., U.S. Pat. No. 4,283,379, the sulfur is drawn off after oxidization of the precipitation catalyst.

In liquid redox processes such as BIO-SR (registered trademark) by NKK, SulFerox (service mark) by Dow Chemical, or Low-Cat II (trademark) by ARI Group, an iron compound containing solution is cyclically reduced and oxidized, such that during the reductive part of the cycle, the hydrogen sulfide containing gases react with the iron compound to form elemental sulfur. In each of the foregoing processes, among others, the elemental sulfur is removed by in-line filters situated in the solution circuit on the loop between the reduction and oxidation portions of the cycle. Depending upon the particle size of the elemental sulfur and the inherent characteristics of sulfur, the filtration of sulfur can be cumbersome. Pore blockages in the filter can result. In addition, a significant quantity of solution is lost each time the filter cake of sulfur is removed.

It is desirable to provide for the facilitated removal of elemental sulfur from the working solution in a liquid redox process.

It is further desirable to provide for such facilitated removal of elemental sulfur, without the simultaneous loss of working solution in a liquid redox process.

SUMMARY OF THE INVENTION

An apparatus and process for the removal of sulfur, in the form of hydrogen sulfide, from gas, such as natural gas or industrial gas streams, in which the sulfur is removed and separated in the form of molten elemental sulfur.

BEST MODE FOR PRACTICING THE INVENTION

Figure 1:
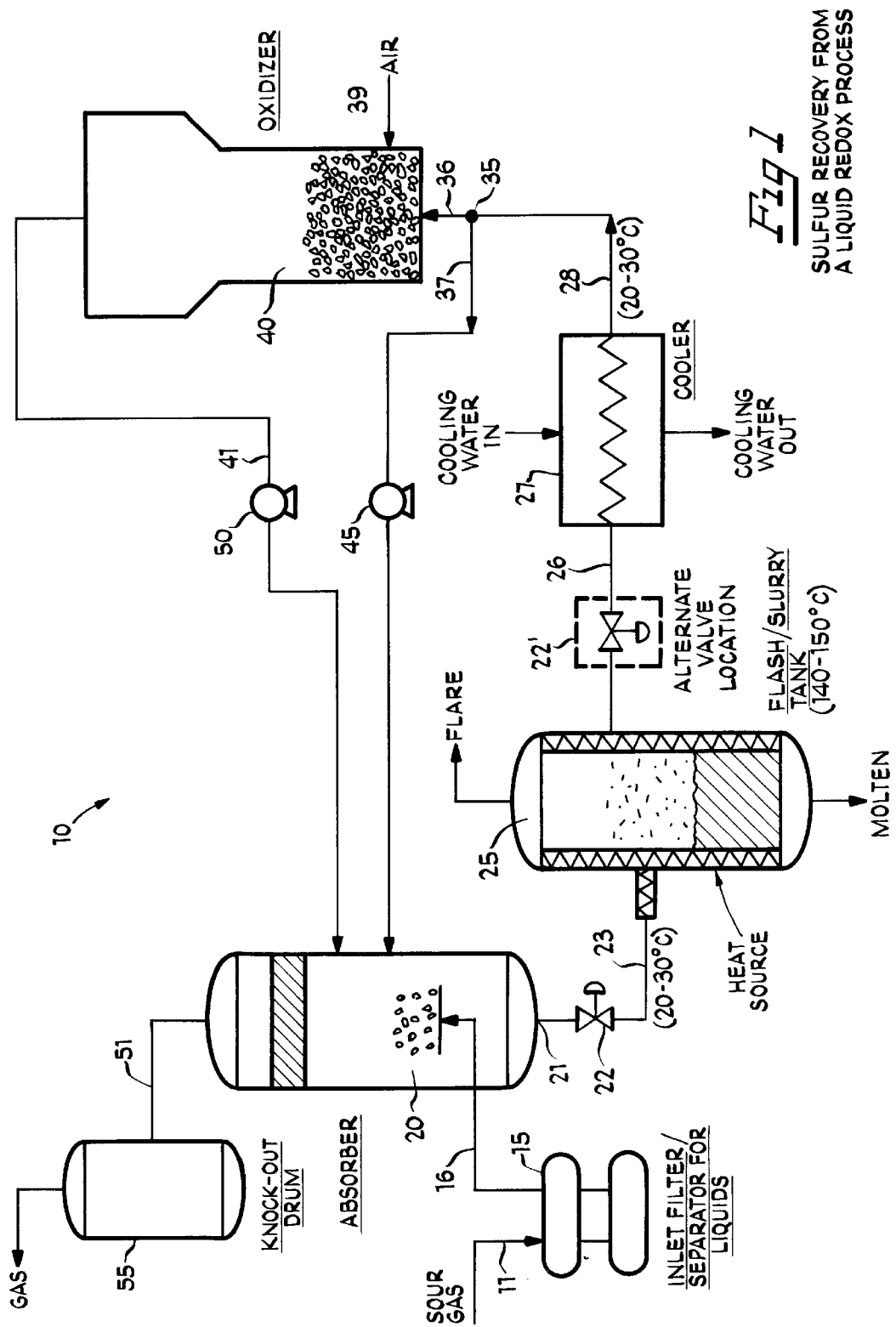
FIG. 1 is a schematic representation of a liquid redox hydrogen sulfide removal process, according to the present invention.

While this invention is susceptible of embodiment in many different forms, there is shown in the drawings and will be described herein in detail, a specific embodiment, with the understanding that the present invention is to be considered as an exemplification of the principles of the invention and is not intended to limit the invention to the embodiment illustrated.

FIG. 1 illustrates, schematically, an embodiment of the present invention, namely, an improved liquid redox system 10. No particular version of liquid redox process is discussed with regard to the present invention, as it to be understood that the principles of the present invention may be applied to all liquid redox processes which precipitate out elemental sulfur from solution, and still be within the scope of the present invention.

System 10 includes inlet filter/liquid separator 15, connected by conduit 16 to absorber 20. At the bottom of absorber 20 is outlet 21. Flow from absorber 20 is regulated by flow control valve 22 (or alternative valve 22'), via conduit 23 to flash/slurry tank 25. Elemental sulfur precipitates out in particulate form, into the spent catalyst solution, in the bottom of absorber 20. The reaction between the catalyst solution and the hydrogen sulfide in the sour gas, occurs at a temperature range of 20°–30° C.

The spent catalyst-solution is then indirectly heated to 140° to 150° C., which is slightly above the melting temperature of elemental sulfur. The indirect heating may be provided by fuel combustion, superheated steam, or electrical heating coil. The mixture of molten sulfur and spent catalyst solution is transported to flash tank 25, which may, for example be maintained at 140°–150° C. The sulfur and solution separate by gravity with the molten sulfur forming a layer at the bottom of flash tank 25. The molten sulfur may then be tapped off from the bottom of tank 25, while the spent catalyst solution is withdrawn from the top layer and sent to oxidizer 40 for regeneration.

Prior to regeneration, the spent solution is again cooled to 20°–30° C., by being passed through water-cooled heat exchanger 27. Other forms of heat exchanger may be employed, so long as the result is the cooling of the spent solution down to 20°–30° C.

In such liquid redox processes, it is possible that the concentration of elemental sulfur in the solution, particularly in the absorber, can rise to such levels as to cause problems such as blockages in the absorber due to sulfur laydown. One way to reduce the concentration would be to increase the rate at which catalyst solution is put through the absorber. However, the amount of catalyst solution which an oxidizer can handle is limited by the need for the solution to reside in the oxidizer for a minimum period of time. This limits the linear velocity at which solution may be piped through the oxidizer. Therefore, in order to increase the volumetric flow rate of solution through an oxidizer, the diameter of the oxidizer must be increased. This potential method of controlling sulfur concentration is unacceptable, however, since it would result in increased equipment size and expenditure.

An alternative method of controlling concentration of sulfur, is to divide the flow of spent solution, such that a majority of the spent solution is cycled directly back to the absorber, while only a portion of the solution is sent to the absorber. The amount sent to the absorber would be sufficient to provide an amount of regenerated catalyst sufficient to meet the requirements of the installation, with regard to the steady-state amount of sulfur being introduced into the absorber from the flow of sour gas.

Depending upon the chemistry of the liquid redox sulfur removal system to which the present invention is being applied, the specific ratio of precipitation catalyst which is being diverted from the oxidizer, directly back to the absorber, will vary, as a function of the residence time which is required in the oxidizer, the flow rate and hydrogen sulfide concentration of the gas being "cleaned", and so on, variables which may be readily accommodated by a practitioner of ordinary skill in the art having the present disclosure before them.

The sulfur-reduced precipitation catalyst solution is thus carried via 31 to junction 35, at which point the flow is split in two. Conduit 36 carries a portion of the precipitation catalyst liquid to oxidizer 40 for regeneration of the precipitation catalyst liquid. Oxygen, in the form of ambient air, is introduced into oxidizer 40 at 39 in sufficient quantity to ensure the restoration of the precipitation catalyst in the solution back to its higher valence state. Conduit 37 carries a portion of the precipitation catalyst directly back to absorber 20, the flow being assisted by pump 45. The regenerated precipitation catalyst liquid exits oxidizer 40 via conduit 41, and is returned, assisted by pump 50, to absorber 20. The sweet (de-sulfurized) gas passes via conduit 51 to knock-out drum 55, where any moisture which may be remaining in the sweet gas is removed. The sulfur-cleaned gas is then transported onward toward its further destination (s).

The present invention is believed to have the following advantages over prior art gas desulfurization processes, in addition to reduction in sulfur laydown and foaming: 1) maximum utilization of the liquid redox solution; 2) control of the size of the oxidizer needed; 3) reduction in the losses of potentially expensive catalyst solution, through the elimination of the in-line filter (up to 50% by mass of a filter cake might be spent solution); and 4) the withdrawal of the sulfur, in molten form, in an in-line procedure, permits the removal of sulfur from solution at a very high rate, which further facilitates the prevention of blockages and other well-known problems which arise during the handling and processing of elemental sulfur.

In addition the present inventive process is believed to be useful in systems operating at 1 to 100 atmospheres or higher. Accordingly, in those portions of the solution flow circuit where foaming caused by the sulfur might be a problem (such as the introduction to the slurry tank), the system might, if desired, be maintained at high pressure at all locations, thus reducing or eliminating the foaming problem.

The present process can be used for liquid redox processes utilizing chelating agents as well as those employing non-chelating agents to catalyze reaction of the sulfur in the absorber. There is also an energy savings, in that most of the process may be operated at relatively low temperatures, 20°–30° C., and only the slurry tank and the entrance to it need to be heated to the 140°–150° C. temperatures needed to melt the sulfur.

In summary the present invention comprises, in part, a process for substantially removing hydrogen sulfide from a gas stream. A stream of gas containing hydrogen sulfide in a known concentration, is directed to a first chamber at a known rate. A quantity of solution, containing an agent which in the presence of hydrogen sulfide will cause the sulfur to precipitate out in the form of particulate elemental sulfur is placed in the first chamber. The agent will be altered by chemical reaction as a result.

The stream of gas is caused to intermingle with the solution. The gas, from which hydrogen sulfide has been substantially removed, is drawn off from the first chamber. The particulate sulfur containing solution is directed from the first chamber to a separation chamber, on the way to which, the solution is heated to above the melting point of the sulfur contained therein. In the second chamber, the molten sulfur separates from the solution, and is drawn off, to be used or disposed of in an appropriate manner, as desired. The solution is then cooled, and at least a portion is sent to a second chamber, for restoration of the agent to its condition prior to reaction with the hydrogen sulfide.

In a preferred embodiment of the invention, the flow coming out of the separation chamber is divided, with one portion going to the second chamber and another portion being transported directly back to the first chamber, so as to keep down the concentration of the sulfur precipitating out from solution.

As the solution departs from the separation chamber, the flow is divided. A portion of the flow is sent directly back to the absorber. Another portion is sent onward to the oxidizer, for restoration of the sulfur precipitation catalyst in the solution to a concentration sufficient to achieve precipitation. After the catalyst has been restored, the solution is directed from the oxidizer to the absorber for reuse.

In a preferred embodiment of the invention, the process further comprises the steps of determining a minimum concentration of the first agent necessary to be maintained in the solution in the first chamber in order to cause the substantially total precipitation of the particulate sulfur from the gas being directed to the first chamber, as a function of the known rate of flow of the gas, and the known concentration of hydrogen sulfide, into the first chamber, when the second chamber which is employed has known dimensions and permits a known maximum rate of flow of the solution therethrough; determining a maximum concentration of particulate sulfur which is desired to be maintained in the first chamber, and, in turn, in the solution which is drawn off from the first chamber; determining the rate at which particulate bearing solution must be withdrawn from the first chamber, in order to maintain the desired maximum concentration of particulate sulfur in the first chamber; and determining the relative proportions of solution which, following passage through the separation chamber, must be diverted to the second chamber and directly back to the first chamber, respectively, as a function of the rate at which the particulate bearing solution must be withdrawn from the first chamber, the maximum concentration of sulfur particulate to be maintained in the first chamber, and the minimum concentration of first agent to be maintained in the first chamber.

The present invention also comprises an apparatus for substantially removing hydrogen sulfide from a gas stream, in which the concentration of particulate sulfur in the working solution is controlled.

The foregoing description and drawings merely explain and illustrate the invention, and the invention is not limited thereto except insofar as the appended claims are so limited, as those skilled in the art who have the disclosure before them will be able to make modifications and variations therein without departing from the scope of the invention.

I claim:

1. A process for substantially removing hydrogen sulfide from a gas stream, comprising the steps of:

directing a stream of gas containing hydrogen sulfide in a known concentration, to an absorber;

placing in the absorber a quantity of solution, containing an agent which in the presence of hydrogen sulfide will cause the sulfur to precipitate out in the form of particulate elemental sulfur, said agent being altered by chemical reaction as a result;

causing the stream of gas containing hydrogen sulfide to intermingle with the solution;

drawing off from the absorber, gas from which hydrogen sulfide has been substantially removed;

withdrawing solution, containing particulate elemental sulfur and chemically altered agent, from the absorber to a separation chamber;

heating the solution containing the sulfur-containing solution, after the solution, after the solution has been drawn from the absorber, so that the sulfur in the solution is melted;

directing the heated solution containing molten sulfur to a separation chamber;

allowing the molten sulfur to form a layer separate from the solution;

drawing off from the separation chamber the molten sulfur;

transporting the substantially sulfur-free solution from the separation chamber;

dividing the flow of solution exiting the separation chamber;

directing at least a portion of the solution from the separation chamber directly back to the absorber from which the stream of solution initially exited, substantially without altering the chemical composition of the solution, relative to its composition as it leaves the separation chamber;

directing at least a portion of the solution to an oxidizer;

placing a second agent in the oxidizer, which, in the presence of the solution, restores the first agent in the solution to its original state prior to reaction with the hydrogen sulfide; and transporting the portion of the solution containing the restored first agent back to the absorber.

2. The process according to claim 1, in which the second chamber which is employed has known dimensions and permits a known maximum rate of flow of the solution therethrough, further comprising the steps of:

determining a minimum concentration of the first agent necessary to be maintained in the solution in the first chamber in order to cause the substantially total precipitation of the particulate sulfur from the gas being directed to the first chamber, as a function of the known rate of flow of the gas, and the known concentration of hydrogen sulfide, into the first chamber.

3. The process according to claim 2, further comprising the step of:

determining a maximum concentration of particulate sulfur which is desired to be maintained in the absorber, and, in turn, in the solution which is to be drawn off from the absorber.

4. The process according to claim 3, further comprising the step of:

determining the rate at which particulate bearing solution must be withdrawn from the absorber, in order to maintain the desired maximum concentration of particulate sulfur in the absorber.

5. The process according to claim 4, further comprising the step of:

determining the relative proportions of solution which, following passage through the separation chamber, must be diverted to the oxidizer and directly back to the absorber, respectively, as a function of the rate at which the particulate bearing solution must be withdrawn from the absorber, the maximum concentration of sulfur particulate to be maintained in the absorber, and the minimum concentration of first agent to be maintained in the absorber.

6. An apparatus for substantially removing hydrogen sulfide from a gas stream, comprising:

an absorber;

means for directing a stream of gas containing hydrogen sulfide in a known concentration, to the absorber;

a quantity of solution, operably disposed in the absorber;

the solution including means for causing the sulfur to precipitate out in the form of particulate elemental sulfur, the means being altered by chemical reaction as a result;

means for causing the stream of gas containing hydrogen sulfide to intermingle with the solution, and, in turn, the means for causing sulfur to precipitate out;

means for drawing off from the absorber, gas from which hydrogen sulfide has been substantially removed;

means for heating the sulfur-containing solution to a temperature high enough to melt the sulfur in the solution;

means for transporting the sulfur-containing solution to the heating means;

means for substantially completely separating the molten sulfur form the solution;

means for dividing the flow of solution exiting the separation chamber:

means for directing at least a portion of the solution from the separation chamber directly back to the absorber from which the stream of solution initially exited, substantially without altering the chemical composition of the solution, relative to its composition as it leaves the separation chamber;

an oxidizer;

means, operably disposed in the oxidizer, for restoring the means for causing sulfur to precipitate to an original condition, prior to reaction with the hydrogen sulfide in the gas;

means for transporting at least a portion of the substantially sulfur-free solution to the oxidizer;

means for transporting the restored solution from the oxidizer to the absorber.

7. The apparatus according to claim 6, wherein the oxidizer has known dimensions and permits a known maximum rate of flow of the solution therethrough, further comprising:

means for determining a minimum concentration of the first agent necessary to be maintained in the solution in the absorber in order to cause the substantially total precipitation of the particulate sulfur from the gas being directed to the absorber, as a function of the rate of flow of the gas, and the known concentration of hydrogen sulfide, into the absorber.

8. The apparatus according to claim 7, further comprising:

means for determining a maximum concentration of particulate sulfur which is desired to be maintained in the absorber, and, in turn, in the solution which is to be drawn off from the absorber.

9. The apparatus according to claim 8, further comprising:

means for determining the rate at which particulate bearing solution must be withdrawn from the absorber, in order to maintain the desired maximum concentration of particulate sulfur in the absorber.

10. The apparatus according to claim 9, further comprising:

means for determining the relative proportions of solution which, following passage through the separation chamber, must be diverted to the oxidizer and directly back to the absorber, respectively, as a function of the rate at which the particulate bearing solution must be withdrawn from the absorber, the maximum concentration of sulfur particulate to be maintained in the absorber, and the minimum concentration of first agent to be maintained in the absorber.

\* \* \* \* \*

UNITED STATES PATENT AND TRADEMARK OFFICE
CERTIFICATE OF CORRECTION

PATENT NO. : 5,843,382

DATED : December 1, 1998

INVENTOR(S) : Amirali G. Rehmet

It is certified that error appears in the above-identified patent and that said Letters Patent is hereby corrected as shown below:

Col. 6, line 5          Delete "second chamber" and insert instead -- oxidizer --.

Col. 6, line 11         Delete "first chamber" and insert instead -- absorber --.

Col. 6, line 13         Delete "first chamber" and insert instead -- absorber --.

Col. 6, line 15         Delete "first chamber" and insert instead -- absorber --.

Signed and Sealed this

Eighth Day of June, 1999

Attest:

Q. TODD DICKINSON

*Attesting Officer*   Acting Commissioner of Patents and Trademarks